United States Patent [19]
Lee et al.

[11] Patent Number: 6,104,687
[45] Date of Patent: Aug. 15, 2000

[54] METHOD AND APPARATUS FOR COUPLING AN OPTICAL LENS TO A DISK THROUGH A COUPLING MEDIUM HAVING A RELATIVELY HIGH INDEX OF REFRACTION

[75] Inventors: Neville K. S. Lee, Kowloon, The Hong Kong Special Administrative Region of the People's Republic of China; John S. Berg, Bellingham; Easen Ho, Belmont, both of Mass.

[73] Assignee: Digital Papyrus Corporation, Sunnyvale, Calif.

[21] Appl. No.: 08/920,101

[22] Filed: Aug. 26, 1997

Related U.S. Application Data

[60] Provisional application No. 60/025,797, Aug. 26, 1996.
[51] Int. Cl.$^7$ ........................................................ G11B 7/12
[52] U.S. Cl. .................... 369/112; 369/44.23; 369/44.14; 369/44.19
[58] Field of Search ................................ 369/112, 44.12, 369/44.11, 44.14, 44.17, 44.18, 44.19, 44.22; 13/113

[56] References Cited

U.S. PATENT DOCUMENTS

| | | | |
|---|---|---|---|
| 5,193,046 | 3/1993 | Lemke et al. | 360/97.02 |
| 5,267,104 | 11/1993 | Albrecht et al. | 360/97.02 |
| 5,278,711 | 1/1994 | Gregory et al. | 360/103 |
| 5,317,463 | 5/1994 | Lemke et al. | 360/97.02 |
| 5,381,284 | 1/1995 | Gregory et al. | 360/97.02 |
| 5,386,400 | 1/1995 | Nakayama et al. | 369/13 |
| 5,488,521 | 1/1996 | Lemke et al. | 360/97.02 |
| 5,526,204 | 6/1996 | French et al. | 360/97.02 |
| 5,543,983 | 8/1996 | Gregory et al. | 360/97.02 |
| 5,559,650 | 9/1996 | Repphun et al. | 360/97.02 |

FOREIGN PATENT DOCUMENTS

| | | |
|---|---|---|
| 0 503 236 A2 | 9/1992 | European Pat. Off. . |
| 0 727 777 A1 | 8/1996 | European Pat. Off. . |

OTHER PUBLICATIONS

"Index Matching Lube for Optical Storage", IBM Technical Disclosure Bulletin, vol. 37, No. 7, Jul. 1, 1994, p. 409.

"Near–Field Optical Data Storage Using Solid Immersion Lens", Applied Physics Letters, vol. 65, No. 4, Jul. 25, 1994, pp. 388–390.

"Optical Recording: A Technical Overview", by Alan B. Marchant, Addison–Wesley Publishing Company, 1990, pp. 166–173.

*Primary Examiner*—Muhammad Edun
*Attorney, Agent, or Firm*—Wolf, Greenfield & Sacks, P.C.

[57] ABSTRACT

In one aspect, an optical recording system including an optical recording medium; a light source; a focusing lens that focuses light generated by the light source to form a focused beam of light directed toward the recording medium; and a coupling medium disposed between the lens and at least one portion of the optical recording medium, the coupling medium being transparent and having a refractive index greater than one. The coupling medium facilitates optical coupling between the lens and the recording medium. In another aspect, the coupling medium is disposed so that no air gap exists in the optical path between the lens and the recording medium. In another aspect, the exit surface of the lens is disposed at a distance from the recording medium that exceeds a distance that an evanescent wave of a high angle ray of the beam of light would travel after contacting air, but the system includes coupling means for coupling the ray of light from the lens to the recording medium. In another aspect, an optical recording medium is provided with at least one layer of fluid disposed atop the recording medium, the fluid being transparent and having a refractive index greater than one.

60 Claims, 9 Drawing Sheets

METHOD AND APPARATUS FOR COUPLING AN OPTICAL LENS TO A DISK THROUGH A COUPLING MEDIUM HAVING A RELATIVELY HIGH INDEX OF REFRACTION

This application claims benefit of Provisional Appl. 60/025,797, filed Aug. 26, 1996.

FIELD OF INVENTION

The present invention relates generally to optical recording systems. More particularly, the invention relates to optical recording systems having a high storage density.

RELATED ART

Optical recording systems employ a focused beam of light to record and read information from a recording medium, which is typically in the form of a specially coated disk of aluminum, glass or plastic. The beam of light is typically generated by a light source and then focused through a lens or other focusing mechanism onto the recording medium. It should be appreciated that it is generally desirable to maximize the amount of information that can be recorded on a recording medium of any particular size, which is accomplished by maximizing the storage density of the recorded information.

To maximize the storage density of recorded information, it is desirable to minimize the spot size of the focused beam of light that contacts the recording medium to read and write information. The spot size of the focused light beam is proportional to the wavelength of the light divided by the numerical aperture of the environment through which the light beam passes before contacting the recording medium. Numerical aperture is a term of art that relates to the effective aperture through which the light beam passes. This can be analogized to a beam of light passing through a physical aperture (e.g., a pin hole) that is smaller in diameter than the light beam. When this occurs, the light passing through the pin hole is scattered, resulting in the formation of a spot that is significantly larger than the pin hole. However, if the physical aperture is increased to a diameter that exceeds that of the light beam, no scattering occurs, resulting in a minimal spot size for the light beam.

As should be understood from the analogy described above, it is generally desirable to maximize the numerical aperture of the environment through which the focused light passes to minimize the spot size of the light beam. For a lens through which the light beam passes, the numerical aperture is equal to the refractive index of the lens material multiplied by $\sin \theta$, where $\theta$ defines the cone angle of the lens. The cone angle $\theta$ is defined by the highest angle at which the focused light rays exit the surface of the lens that is closest to the recording medium. This is illustrated in FIG. 1, which conceptually illustrates a lens element I having a flat surface 3 disposed adjacent an optical recording medium 5. The arrows 7 illustrate a plurality of focused light rays exiting the bottom surface 3 of the lens 1 at an exit point 9. The cone angle 0 of the lens is defined by the highest angle from the dotted vertical line 11 at which a focused ray of light exits the lens 1.

As mentioned above, to minimize the spot size of the focused light beam, the numerical aperture (equal to the refractive index times $\sin \theta$) of the environment through which the beam passes should be maximized. The highest value that $\sin \theta$ can obtain is 1, when $\theta$ is equal to 90°. Therefore, it is desirable to form the lens 1 in such a manner that the highest angle $\theta$ at which light rays exit the lens is approximately 90°. While such a lens cannot be formed, lenses with an angle $\theta$ approaching 90° (e.g., 71°) have been formed using techniques that are known in the art.

In addition to maximizing the cone angle of the lens, the other factor that controls the numerical aperture (and consequently the spot size) of the optical recording system is the refractive index of the environment through which the light beam passes. The lens 1 and recording medium 5 can be made from conventional materials having relatively high refractive indices, i.e., refractive indices greater than 2. However, the factor that limits the numerical aperture in conventional optical recording systems is the air gap 13 between the bottom surface 3 of the lens and the top of the recording medium 5. In particular, air has a refractive index equal to 1. Therefore, no matter how high the refractive index is of the lens 1 and the recording medium 5, the numerical aperture for the recording system is limited by the lower refractive index of the air gap 13, thereby limiting the extent to which the spot size of the focused light beam can be minimized.

Relatively recent advances in the field of optical recording have attempted to take advantage of a concept known as evanescent coupling to minimize or eliminate the impact of the air gap 13 on the numerical aperture of the recording system. The concept of evanescent coupling is described making reference to FIG. 2, which illustrates a light beam 15 exiting the bottom surface 3 of the lens 1. As should be appreciated by those skilled in the art of optical recording, when a light beam passes through a boundary between two materials having different indices of refraction (e.g., the bottom surface 3 defines such a boundary between the lens 1 and the air gap 13), some portion of that light beam is reflected as represented in FIG. 2 by the reflected light beam 15*f*. The components of the light beam that are reflected are the rays at a high angle $\theta$ to vertical. The particular angle at which reflection occurs is dependent upon the refractive index of the lens material. As will be appreciated by those skilled in the art, if the lens were not disposed adjacent the recording medium, the high angle rays would be totally internally reflected at the surface of the lens, and would not pass out of the lens. However, when the exit surface of the lens is disposed adjacent the recording medium, the light beam is not reflected precisely at the boundary 3 between the lens and the air gap 13. Rather, a component of the light beam known as the evanescent wave extends some distance d beyond the boundary (the exit surface 3 of the lens in FIG. 2) before being reflected.

The concept of evanescent coupling in conventional systems involves positioning the exit surface 3 of the lens 1 at a small distance c from the recording medium. If the distance c is small enough, the evanescent wave for a number of the high angle rays can travel over a distance d that is greater than the distance c, thereby coupling to the recording medium. The smaller the distance c, the greater the angle $\theta$ of rays that can be evanescently coupled. If the distance c is made small enough so that none of the rays within the critical angle of the lens (i.e., the highest angle at which the lens can pass a ray of light even if the exit surface was adjacent a medium having a refractive index equaling that of the lens) are totally internally reflected, then the evanescent component of all of the rays of the light beam that the lens can pass contact the recording medium 5. As a result, the air gap 13 has no impact on the numerical aperture of the system, because any internal reflection that would otherwise be caused by the air gap is eliminated by positioning the exit surface 3 of the lens close enough to the recording medium 5 so that the recording medium is contacted by the evanescent wave of each ray of light.

Some conventional optical recording systems employ a lens element that is positioned below the recording medium at a fixed distance c from the surface thereof. Such systems are incapable of positioning the exit surface of the lens (i.e., the surface from which the light beam exits when directed toward the recording medium) close enough to the disk to achieve evanescent coupling. Relatively recent advances in the field of optical recording have attempted to mount the lens to a slider that is known in the art as a flying head because of the principles on which it relies to maintain its positioning with respect to the recording medium. In particular, during operation of an optical recording system, the recording medium is typically rotated at a high speed (e.g., 3,600 RPM) which causes an air flow in the direction of rotation near the surface of the disk. The slider or head is placed by a mechanical actuator above and in proximity to the surface of the disk, so that the air flow passes between the surface of the disk and the lower features of the head, thereby forming a cushion of air that generates an upward force on the head that causes the head to fly over the surface of the disk.

The use of flying head technology, which has more typically been employed in magnetic recording systems, generally enables the bottom surface 3 of the lens to be positioned closer to the surface of the recording medium than in a system employing a fixed lens. However, difficulty is still encountered in attempting to fly the head at a sufficiently low height above the disk so that the exit surface 3 (FIG. 2) is positioned at a distance c above the recording medium that is less than the distance d of the evanescent wave for the high angle rays. In particular, as will be appreciated by those skilled in the art, reliability problems frequently occur when attempting to fly a flying head at a very small distance above the recording medium. Mechanical vibrations in the system, asperities or bumps in the surface of the disk or other factors can result in variations in the height of the head above the disk. Flying the head too low can lead to contact between the head and disk, which can result in catastrophic product failure, e.g., a head crash which occurs when the head contacts the disk surface with sufficient force to damage the head or disk surface resulting in a loss of data. Thus, potentially serious reliability issues arise in attempting to use flying head technology to achieve evanescent coupling between an optical lens and the recording medium.

Typical wavelengths for the light used in an optical recording system equal 685 nm. A significant percentage of the high angle rays will be evanescently coupled at a distance d (FIG. 2) of approximately 0.1–0.25 of the wavelength. To achieve coupling of the high angle rays in conventional systems employing flying head technology, the flying head must be flown at a height that enables the bottom surface 3 of the lens 1 to be positioned less than this small evanescent coupling distance from the surface of the recording medium.

In addition to the reliability concerns expressed above, another difficulty is presented in attempting to achieve coupling of the high angle rays in the conventional manner due to the topology of the recording disk used in many optical recording systems. In particular, as shown in FIG. 2, recording disks in many optical recording systems include a plurality of grooves 17 that are used for servo tracking purposes to ensure that the focused light beam remains positioned above the appropriate track on the disk. The formation of the grooves 17 leaves a plurality of lands 19 separated thereby. Grooves 17 and lands 19 extend out of the plane of the page in FIG. 2, which is the direction of flight for the flying head. In a conventional optical recording system, the grooves typically have a depth D equal to approximately 0.167–0.25 of the wavelength of the focused light beam.

Although some optical recording systems record information only on the lands 19 of the disk, higher density recording systems also record information on the bottom surfaces 17b of the grooves. As illustrated in FIG. 2, it is more difficult to achieve evanescent coupling of the high angle rays to the bottom surface 17b of the grooves than to the top of the lands 19, due to the additional gap of air extending through the length of the grooves 17. Thus, as shown in FIG. 2, it is possible to dispose the bottom surface 3 of the lens 1 a distance c from the top surface of the disk that will achieve evanescent coupling with the top surface of the lands 19, but not with the bottom surface 17b of the grooves. It should be understood that although evanescent coupling of the high angle rays to the lands increases the density of information stored on the lands, the total storage density of the disk is not maximized unless evanescent coupling of the high angle rays is also achieved to the bottom surface 17b of the grooves.

In view of the foregoing, it is an object of the present invention to provide an improved method and apparatus for achieving high density recording in an optical recording system.

SUMMARY OF THE INVENTION

One illustrative embodiment of the invention is directed to an optical recording system, comprising an optical recording medium; a light source; a focusing lens that focuses light generated by the light source to form a focused beam of light directed toward the recording medium; a first coupling medium disposed between the focusing lens and the optical recording medium; and a second coupling medium disposed between the first coupling medium and at least one portion of the optical recording medium, the second coupling medium being transparent and having a refractive index greater than one, the second coupling medium being separable from both the recording medium and the first coupling medium.

Another illustrative embodiment is directed to an optical recording system, comprising an optical recording medium; a light source that generates a beam of light; and a lens that is disposed between the light source and the recording medium, the lens having an exit surface from which the beam of light exits and passes through an optical path between the lens and the recording medium; and a coupling medium disposed between the exit surface of the lens and at least one portion of the recording medium, the coupling medium being disposed between the lens and the at least one portion of the recording medium so that no air gap exists in the optical path.

A further illustrative embodiment of the invention is directed to an apparatus, comprising an optical recording medium; and at least one layer of fluid disposed atop the optical recording medium, the fluid being transparent and having a refractive index greater than one.

Another illustrative embodiment of the invention is directed to an optical recording system, comprising an optical recording medium having a plurality of recording areas on which information can be recorded; a light source that generates a beam of light; a lens that is disposed between the light source and the recording medium, the lens having an exit surface from which the beam of light is directed toward the recording medium, the exit surface of the lens being disposed at an access distance from at least one of the plurality of recording areas when the optical recording system accesses the at least one of the plurality of recording areas, the access distance exceeding a distance that an evanescent wave of at least one high angle ray of the beam of light would travel after exiting the exit surface of the lens and contacting air; and coupling means for coupling the at least one high angle ray of the beam of light to the at least one of the plurality of recording areas.

A further illustrative embodiment of the invention is directed to a method of operating an optical recording system that includes an optical recording medium having a plurality of recording areas on which information can be recorded, a light source that generates a beam of light, and a lens that is disposed between the light source and the recording medium, the lens having an exit surface from which the beam of light exits the lens and is directed toward the recording medium. The method comprises steps disposing the exit surface of the lens at a distance from at least one of the plurality of recording areas that exceeds a distance that an evanescent wave of at least one high angle ray of the beam of light would travel after exiting the exit surface of the lens and contacting air; and coupling the at least one high angle ray of the beam of light from the exit surface of the lens to the at least one of the plurality of recording areas.

DETAILED DESCRIPTION OF THE INVENTION

In accordance with one illustrative embodiment of the invention, a medium having a refractive index greater than that of air (i.e., greater than 1) is disposed between the exit surface (e.g., bottom surface 3) of the lens and the surface of the recording medium (e.g., disk 5). In this manner, optical coupling can be achieved between the lens and the recording medium through the coupling medium disposed therebetween. This results in a numerical aperture that is not limited by an air gap between the lens and recording medium as in conventional systems (i.e., a numerical aperture greater than one), enabling the use of a reduced spot size of the focused light beam, leading to higher density recording.

It should be appreciated that the lens 1 discussed below in connection with various embodiments of the present invention can be of different types. For example, the lens 1 can be a focusing lens that focuses the beam of light onto the recording medium. Alternatively, the lens can be a solid immersion lens (SIL) or a gradient index lens that need not participate in the focusing of the light beam, but which serves the purpose of providing a lens element that can be positioned close to the recording medium. The use of an SIL in an optical recording system is known, as discussed in U.S. Pat. No. 5,125,750, which is incorporated herein by reference.

Figure 1:
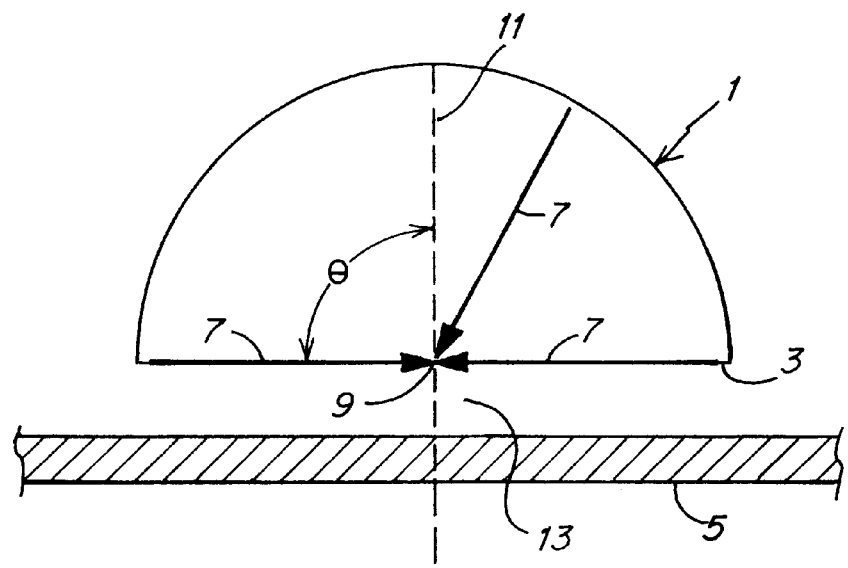
FIG. 1 illustrates the cone angle of a lens positioned above a recording medium.
Figure 2:
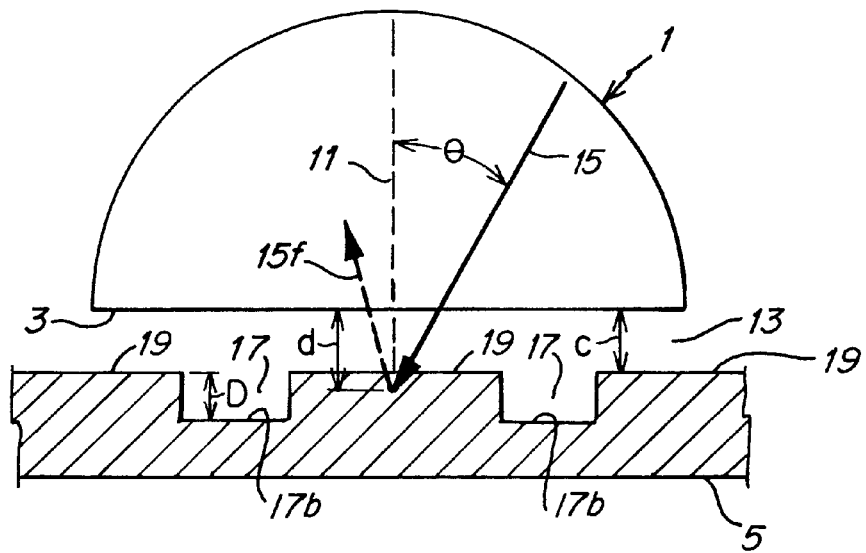
FIG. 2 illustrates a lens evanescently coupled to a recording medium.
Figure 3:
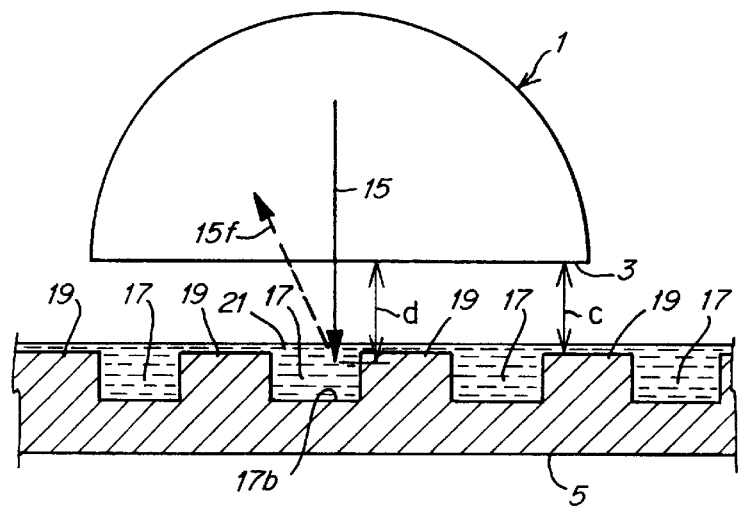
FIG. 3 illustrates an optical recording medium including a layer of highly refractive fluid filling grooves in the recording medium in accordance with one illustrative embodiment of the invention.

In one embodiment of the invention shown in FIG. 3, a fluid 21 having an index of refraction greater than 1 is disposed within each of the grooves 17 on the recording medium. As with the disk discussed above in connection with FIG. 2, the grooves 17 define tracks to be followed by the lens 1, and extend out of the plane of the page, which is the direction of flight when a flying head is used to support the lens. When used in an optical recording system in which the bottom surface 3 of the lens is positioned a distance c from the disk that is less than the evanescent wave extinction distance d for the high angle rays, the focused light beam is optically coupled to the bottom surfaces 17b of the grooves through the fluid 21. Since the fluid 21 has a refractive index greater than that of air, its use to optically couple the lens 1 to the bottom surface 17b of the grooves enables the numerical aperture of the recording system shown in FIG. 3 to exceed that of conventional systems in which no such fluid is used, because the light beam need not pass through an air gap extending along the length of the grooves 17.

In the embodiment of the invention shown in FIG. 3, the highly refractive fluid 21 is disposed not only within the grooves 17, but also forms a layer atop the lands 19 of the recording medium. This embodiment provides a number of advantages in addition to facilitating optical coupling between the lens and the bottom surface 17b of the grooves. The layer of fluid atop the lands 19 also facilitates optical coupling between the lands and the lens. In particular, providing a layer of the highly refractive fluid above the lands 19 facilitates optical coupling between the lens and the lands 19, even when the bottom surface 3 of the lens is disposed at a distance c from the top surface of the lands 19 that is greater than the evanescent wave extinction distance d for the high angle rays, so long as the difference between these distances does not exceed the thickness of the fluid layer 21 atop the lands 19. In addition, the process of distributing the fluid 21 to the grooves 17 may be simplified by developing a layer of the fluid 21 atop the lands 19 of the recording medium, as well as within the grooves.

Furthermore, in addition to providing the benefits described above relating to the optical performance of the system, it should be appreciated that the layer of fluid 21 also provides some protection for the surface of the disk in the event of contact with the head, thereby also increasing the reliability of the system.

Although the embodiment shown in FIG. 3 has the advantages described above, it should be understood that the present invention is not limited in this respect, and that coupling between the lens and the bottom surface 17b of the grooves can, subject to the use of an appropriate dispersion scheme, be provided only within the grooves 17, and not atop the lands 19.

The fluid 21 can be any suitable fluid having an index of refraction greater than 1. For example, the fluid 21 can be any of a number of disk lubricants that are conventionally used the field of magnetic recording systems to protect the disk from contact with a flying head, such as Fomblin R Z-Dol, commercially available from Montedison S.P.A. The fluid 21 may be applied in a monolayer of 10–20 A, and may preferably be resistant to evaporation.

It should be understood that in the system shown in FIG. 3, so long as the lens is positioned within the evanescent wave extinction distance d from the disk, the higher the index of refraction of the fluid 21, up to the point where it matches that of the lens and the recording medium, the greater the numerical aperture of the recording system. For example, the fluid can be any of the types of oils used with oil immersion microscopes. In one embodiment of the invention, the liquid 21 is selected to have an index of refraction that matches that of the lens 1 and the recording medium 5, each of which has an index of refraction equal to approximately 2. An example of a highly refractive fluid suitable for use in filling the grooves 17 is a liquid commercially available from R.P. Cargille Laboratories, Inc. of Cedargrove, N.J., identified as series EH, and having an index of refraction of 2.01–2.11. This specific coupling material is provided merely for illustrative purposes, and it should be understood that the present invention is not limited to this or any other particular material.

It should be understood that the recording medium 5 is conventionally formed from one or more layers in addition to the active layer on which information is actually recorded. For example, an air incident medium conventionally includes a number of layers that are disposed on the opposite side of the active layer from the surface of the recording medium on which the light beam is incident. A typical air incident medium includes, in succession beginning from the side of the medium away from the light beam, a substrate layer, a reflective layer, a first dielectric insulating layer, the active layer and a second dielectric insulating layer. The second insulating layer is the surface of the medium on which the light beam is incident and serves as a protective coating for the active layer. For an air incident medium, this insulating layer is typically the only layer of the recording medium through which the light beam passes before contacting the active layer. The other type of conventional recording medium is a substrate incident medium in which the light beam passes through the substrate layer before reaching the active layer. A typical substrate incident medium includes, in succession beginning from the side of the medium on which the light beam is incident, a substrate layer, a first dielectric insulating layer, the active layer, a second dielectric insulating layer, a reflective layer and a protective layer. Thus, the light beams passes through the substrate layer and the first dielectric insulating layer before reaching the active layer. The reference in the present application to a refractive index of the recording medium refers to the lowest refractive index of any of the layers of the recording medium that are disposed between the active layer and the surface of the recording medium on which the light beam is incident.

It should be understood that the particular recording medium configurations discussed above are provided merely for illustrative purposes, and that the present invention is not limited to use with a recording medium of this or any other particular type.

In another embodiment of the invention, the highly refractive fluid layer 21 described above is combined with a conventional lubricant that protects the surface of the disk. In this respect, the lubricant can be provided directly on the disk in a very thin layer (e.g., 2.5 nm) that enhances the reliability of the system without impeding optical performance. The highly refractive fluid layer can be disposed above the lubricating layer to improve the optical characteristics of the system. The layer of highly refractive fluid can have a thickness that is preferably greater than 100 nm, and in one embodiment is equal to approximately 500 nm.

The fluid layer 21 can be disposed within the grooves 17, and optionally atop the lands 19, in any of a number of ways, and the present invention is not limited to any particular technique. It should be appreciated that in view of the high rotation rate of the disk in operation, there is a risk of the fluid layer spinning off the disk, particularly if the layer is very thick in the areas above the lands 19. Therefore, the fluid 21 can be selected to be particularly wettable to the disk material 5 to resist spinning off of the disk. A similar problem is encountered in the art of magnetic disks used with flying heads, wherein a lubricant is conventionally disposed atop the magnetic disk to prevent the disk surface from harm if contacted by the flying head. The teachings of that art with respect to techniques for disposing a lubricant atop the surface of the disk can be employed in disposing the fluid layer 21 atop the disk in the embodiment of the invention shown in FIG. 3.

Figure 4:
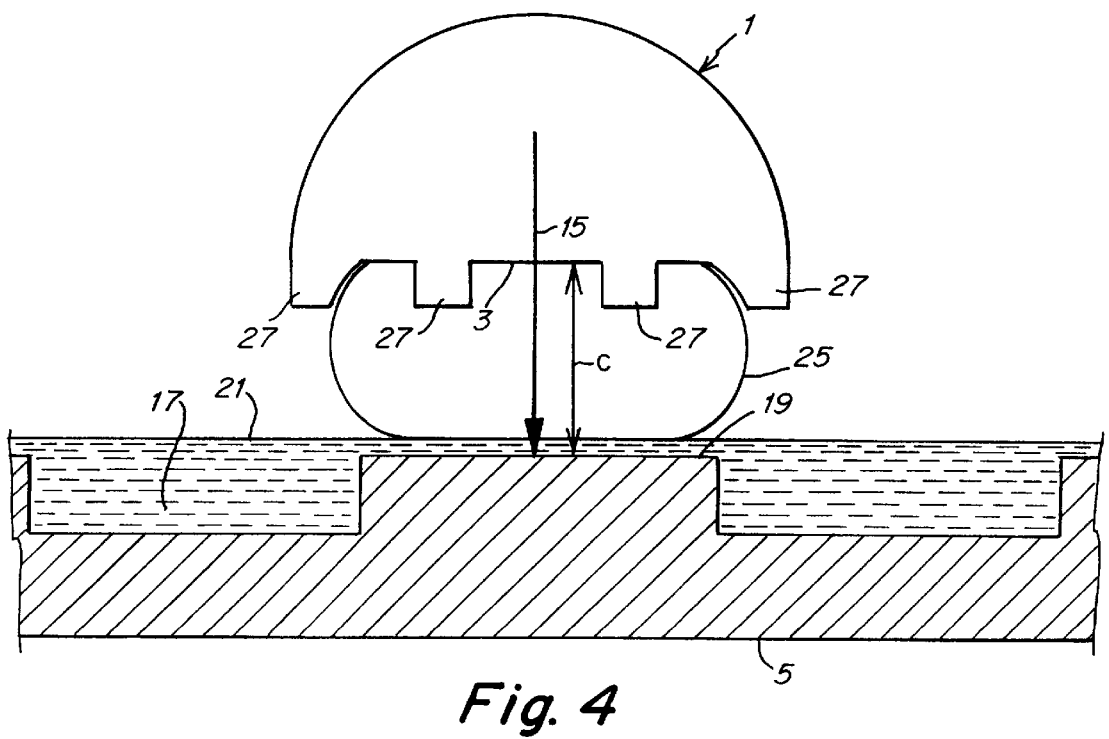
FIG. 4 illustrates the disposition of a highly refractive fluid bearing between the lens and the recording medium in accordance with another illustrative embodiment of the invention.

Another illustrative embodiment of the present invention is shown in FIG. 4. In this embodiment, a fluid bearing 25 is disposed between the lens 1 and the surface of the recording medium 5, such that the focused beam of light 15 exiting the lens 1 does not pass through any air gap before reaching the surface of the disk 5. The fluid bearing 25 can be formed from a fluid having a refractive index greater than one to increase the numerical aperture of the optical recording system as compared with conventional systems that have an air gap disposed between the lens and the recording medium 5. As with the fluid 21 described above in connection with the embodiment of FIG. 3, the fluid that forms the fluid bearing 25 preferably has a refractive index that is as high as that of the lens and the recording medium 5 (e.g., a refractive index of approximately two), and is preferably resistant to evaporation.

It should be understood that it is generally desirable to maintain the integrity of the fluid bearing 25 as the lens 1 is moved about over the surface of the recording medium. This can be accomplished in any number of ways. For example, in one embodiment of the invention, the lens 1 is shaped to facilitate movement of the fluid bearing 25 along with the lens 1. For example, in one illustrative embodiment of the invention shown in FIG. 4, the lens is provided with a plurality of grooves 27 that essentially cup the top of the fluid bearing 25, to facilitate maintenance of the integrity of the column of fluid that defines the bearing 25. This arrangement is provided merely for illustrative purposes, and it should be understood that other lens shapes can alternatively be employed to achieve the same purpose.

Figure 6:
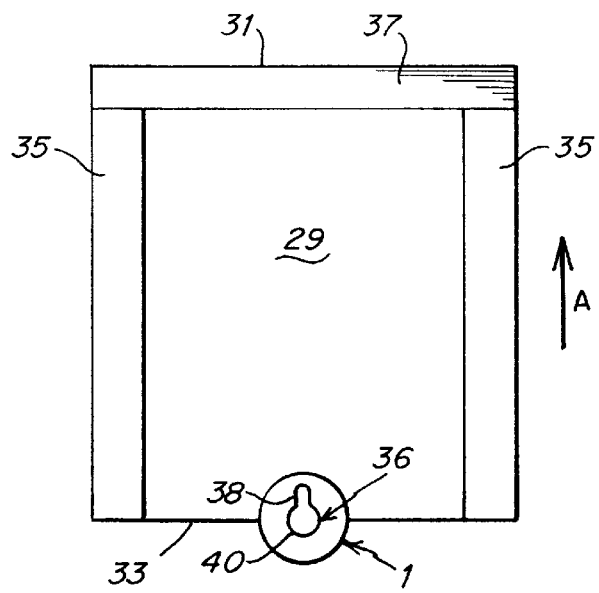
FIG. 6 is a schematic representation of one illustrative implementation of a flying head for supporting a lens above a recording medium in accordance with one illustrative embodiment of the present invention.

In another illustrative embodiment of the invention shown in FIG. 6, the lens 1 is provided with a key hole slot 36 that is arranged to maintain the integrity of the fluid bearing 25. The key hole slot includes an elongated portion 38 and a bulb 40 that create a capillary effect that maintains the fluid bearing in contact with the lens 1. Furthermore, as discussed in more detail below in connection with FIG. 6, in operation, the lens is flown in the direction shown by arrow A in FIG. 6 with the elongated portion 3 8 of the key hole slot leading the bulb portion 40. The key hole slot is arranged so that the air flow of the disc underneath the lens pushes the fluid bearing to the rear of the reservoir where it collects in the bulb portion 40. The lens 1 is arranged so that the bulb portion 40 of the key hole slot is coincident with the portion (e.g., the center) of the lens through which the focused light beam exits.

Figure 7:
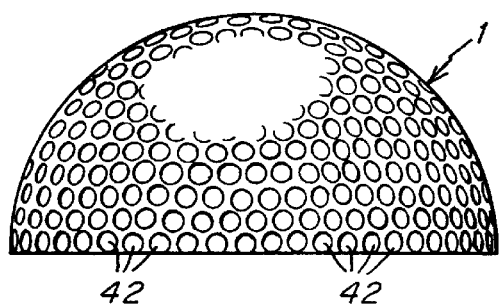
FIG. 7 illustrates a lens that is configured to facilitate maintenance of the fluid bearing used in accordance with one illustrative embodiment of the invention.

In an alternate embodiment of the invention shown in FIG. 7, the lens 1 can be formed of a porous material (e.g., porous silica) that includes a plurality of pores 42 that can absorb the fluid to maintain the integrity of the fluid bearing. It is contemplated that the porous material can be filled with the fluid that forms the bearing 25 (FIG. 4).

In addition, the fluid selected to form the fluid bearing 25 is preferably selected to be wettable to the lens 1, so that when the lens is moved about the surface of the disk to read or write different tracks, the integrity of the fluid bearing 25 is maintained between the lens and the disk. In this respect, the outer surface of lens 1 can be treated to encourage adherence or chemical bonding of the fluid bearing 25 thereto.

In one embodiment of the invention, the fluid bearing can be formed from an optical gel that has a sufficiently high surface tension to further facilitate maintenance of the integrity of the fluid bearing. An example of such an optical gel is commercially available from R.P. Cargille Laboratories, Inc. of Cedargrove, N.J., under product code 0607, and has a refractive index of 1.457. When an optical gel is employed to form the fluid bearing 25, the treatment of the lens can include providing an extremely clean lens surface for the gel to adhere to, and/or etching discontinuities into the lens surface. Etched discontinuities provide physical features for the gel to adhere to, and expose a clean and contaminant-free portion of the lens surface where the features are formed to encourage adherence of the gel. Alternatively, the fluid that forms bearing 25 can be a fused silica matching liquid that adheres well to the glass lens, such as fluids commercially available under product codes 50350 and 06350 from R.P. Cargille Laboratories, Inc. of Cedargrove, N.J.

In addition to taking steps to ensure that the fluid bearing adheres well to the lens, the fluid that forms the bearing 25 can also be selected so that it is not wettable and does not adhere well to the recording medium 5, thereby further facilitating maintenance of the integrity of the bearing 25 as the lens moves about over the top of the disk. It should be understood that when the disk is coated with a lubricant to reduce the likelihood of damage to the disk due to head contacts as discussed above, the fluid bearing can be selected so as to not be wettable to the lubricant.

As shown in FIG. 4, the embodiment of the present invention that employs the fluid bearing 25 between the lens 3 and the disk 5 can be used in conjunction with the highly refractive fluid layer 21 that fills the grooves 17 in the disk. The fluid bearing 25 can be selected so as to not be wettable to the fluid layer 21, to facilitate maintenance of the integrity of the bearing as discussed above.

When both of these features of the present invention are employed together, the lens 3 can be coupled through the fluid bearing 25 and the fluid layer 21 to the optical disk both in the areas of the lands 19, and the grooves 17. Examples of fluids that can be used in this embodiment include the optical gel commercially available from R.P. Cargille Laboratories, Inc. of Cedargrove, N.J. under product code 0607 to form the fluid bearing 25, and the liquid commercially available from the same company and identified as series EH to form the fluid layer 21.

Although using the features of the present invention relating to the fluid bearing 25 and fluid layer 21 together provides a number of advantages, it should be understood that each of these embodiments of the present invention can be used independently, such that the fluid bearing 25 can be employed without the use of the fluid layer 21 filling the grooves. In this respect, the fluid that forms the bearing 25 can be selected to have sufficient surface tension that the bearing is not dispersed when it passes over the grooves 17 in the disk, and can optionally be used in conjunction with a lubricant that protects the surface of the disk in the manner described above. This is particularly advantageous for systems in which data is not stored in the disk grooves 17, making it unnecessary to optically couple to the grooves.

It should be appreciated that the embodiment of the invention that employs the fluid bearing 25 between the lens 1 and the recording medium 5 provides significant advantages over the prior art. In particular, the fluid bearing 25 increases the reliability of the system by enabling optical coupling of the high angle rays (i.e., those that would be totally internally reflected at an interface with air) to be achieved while the flying head that supports the lens 1 is flown at a greater distance c above the surface of the disk than would otherwise be possible. As discussed above, without the fluid bearing 25, optical coupling between the lens 1 and the disk 5 would require that the lens be flown at an extremely close distance c to the surface of the recording medium, such that the distance c would need to be less than the evanescent wave extinction distance d (FIG. 3). Flying the head that close to the recording medium can result in unreliable performance due to potential contacts between the head and the recording medium. In contrast, the fluid bearing 25 enables optical coupling to occur while flying the head at a significantly greater distance from the recording medium, resulting in more reliable performance.

It should be appreciated that if the refractive index of the fluid bearing is equal to that of the lens material, no total internal reflection of the high angle rays is experienced at the interface between the exit surface of the lens and the fluid bearing. Thus, the high angle rays can be optically coupled to the recording medium to the full extent enabled by the lens (i.e., up to the critical angle of the lens). Although it is desirable to enable optical coupling of the full range of the high angle rays enabled by the lens, it should be understood that the invention is not limited in this respect. Rather, one embodiment of the present invention is directed to the use of a fluid bearing (or other coupling medium such as fluid layer 21 of FIG. 4) having any refractive index greater than that of air, so that at least some of the high angle rays that would be totally internally reflected at an interface with air can be optically coupled to the recording medium.

As discussed above, when the embodiment of the present invention including the liquid bearing 25 is employed, it is desirable to take measures to ensure that the fluid bearing 25 will remain intact as the lens is moved about over the surface of the disk 5. In addition to the techniques described above (e.g., the contoured lens 1, the compatibility between the fluid column 25 and the lens 1, the lack of compatibility between the fluid column 25 and the disk surface) in another embodiment of the present invention, the flying head that carries the lens is constructed in a manner to facilitate the maintenance of the integrity of the fluid bearing 25.

Figure 5:
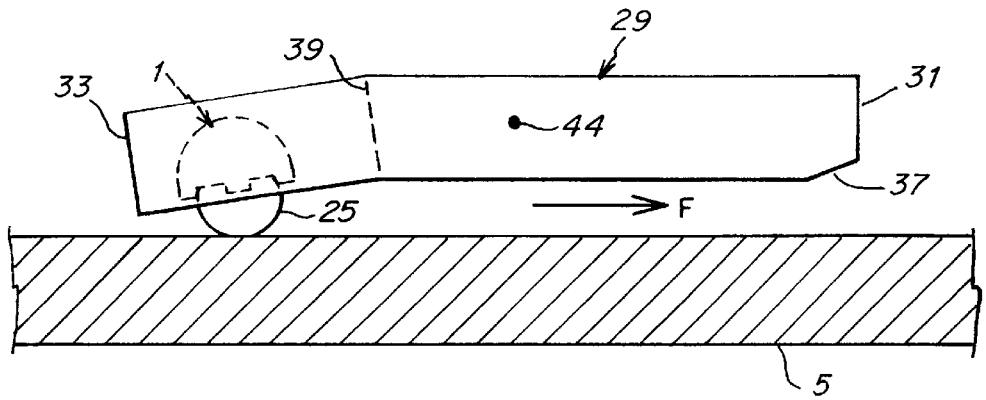
FIG. 5 illustrates a flying head having a static bias to facilitate coupling of the fluid bearing between the lens and recording medium in accordance with one illustrative embodiment of the invention.

In accordance with one illustrative embodiment of the invention, the head 25 to which the lens 1 is mounted is constructed and arranged to apply a downward force on the fluid bearing 25 to ensure contact between the fluid bearing and the disk 5 to assist in maintaining the integrity of the fluid column as the lens 1 is moved about over the top of the disk. One such embodiment of the invention is shown in FIG. 5, wherein the downward force is generated by flying the head 29 at a relatively high tilt angle, such that the edge 31 that leads the head in the direction of flight F is spaced a greater distance from the surface of the disk 5 than is the trailing edge 33. As a result, torque is generated by the trailing edge 33 of the head on the fluid bearing 25 to achieve the advantages discussed above. It should be understood that FIG. 5 represents a different view than FIGS. 2–4; in FIGS. 2–4, the direction of the flight F along a particular track is straight out of the page. To achieve the tilt angle and desired downward force on the fluid bearing 25, the head 29 is provided with a static pitch bias as shown at 39 in FIG. 5, such that the trailing portion of the head 29 is biased to exert downward pressure on the fluid bearing 25.

An illustrative example of a head 29 suitable for use in the present invention is shown in FIGS. 5–6. However, it should be understood that the features of the present invention relating to the disposition of a highly refractive coupling medium between the lens and the recording medium can be used in connection with any type of optical recording system, and that the present invention is not limited to any particular arrangement of the head 29 for positioning the lens above the disk, and in fact, is not limited to use in optical systems employing a flying head. As shown in the bottom view of FIG. 6, the illustrative head 29 includes a pair of rails 35 extending along the lateral sides of the head, and a ramp 37 disposed along the leading edge 31. The lens 1 is disposed at the trailing edge 33 of the head.

It should be understood that the downward pressure on the fluid bearing 25 can be achieved in a number of other ways, and that the present invention is not limited to the particular arrangement shown in FIGS. 5–6. For example, this result can also be achieved by simply offsetting the pivot point 40 (FIG. 5) about which the head is attached to a suspension (not shown) that positions the head 29 above the disk. If the pivot is offset toward the leading edge 31 of the head, the head will tend to rotate counterclockwise in FIG. 5 about the pivot point 40, thereby generating a downward force on the fluid bearing 25.

The use of a medium to couple between the lens and the storage medium also provides an additional optical advantage. In particular, if no such medium was employed and the system attempted to fly the lens sufficiently close to the surface of the disk to achieve evanescent coupling, changes in the flying height of the lens due to bouncing of the head when flying over the recording medium could result in changes in the intensity of the light beam that contacts the disk. In particular, if the head bounces upwardly so that the lens moves out of the evanescent coupling range, the intensity of the light beam contacting the disk will decrease. The use of the medium disposed between the lens and the recording medium in accordance with one illustrative embodiment of the invention advantageously maintains optical coupling of the high angle rays so long as the lens does not lose contact with the coupling medium. Thus, the embodiment of the invention that employs the fluid bearing can accommodate more head bounce than systems in which a fluid bearing is not employed. As long as the fluid bearing remains in contact with the lens 1 and the surface of the disk, those two elements will be optically coupled. Thus, the embodiment of the invention that employs the fluid bearing 1 can accommodate bouncing of the head, so long as the head does not move far enough away from the surface of the disk to result in loss of contact between the lens and the fluid bearing, or loss of the depth of focus for the lens.

The use of the fluid bearing in accordance with one illustrative embodiment of the invention also results in a stiffer air bearing that is less prone to significant bouncing or changes in position of the head with respect to the disk. In particular, as should be appreciated from FIG. 5, the fluid bearing 25 disposed below the lens 1 is more resistant to compression than air, and therefore, resists downward bouncing of the head 29. In addition, as discussed above, the head 25 in one embodiment of the invention is arranged to apply a downward force to the fluid bearing 25, thereby making the head 29 more resistant to air currents that would tend to bounce the head upwardly away from the surface of the disk. Surface tension between the fluid bearing 25 and the lens also resists upward bouncing of the head. In addition, the fluid bearing 25 absorbs some of the energy imparted thereto as the head flies above the disk, thereby providing a dampening effect. Consequently, the fluid bearing results in advantages distinct from optical coupling. Therefore, it is contemplated that the fluid bearing can be used to provide these advantages in some systems even if formed of a material having a refractive index that is not high enough to increase the optical coupling of the system.

The use of the fluid bearing 25 enables the lens to achieve optical coupling of the high angle rays while being flown at a relatively large height above the surface of the disk. For example, the fluid bearing can enable the lens to be positioned from approximately 0.5–1 micron above the surface of the disk while maintaining optical coupling of the high angle rays. This is a relatively large height away from the surface of the disk, which facilitates reliable operation. A conventional system without the fluid bearing would need to fly approximately 0.15 micron to achieve optical coupling of the high angle rays. In fact, in view of the relatively large flying height that can be used with the embodiment of the invention that employs the fluid bearing, this embodiment of the invention can be used in association with optical disks that need not meet the strict tolerance requirements for disks used in some systems that fly much lower. For example, a plastic disk, which is prone to having more asperities and waves in its surface than a hard disk formed from aluminum or glass, can be used in association with this embodiment of the invention.

In the illustrative embodiments discussed above, the optical recording system employs a solid immersion lens as the lens 1 having its exit surface disposed adjacent the recording medium. However, as mentioned above, the present invention is not limited in this respect. For example, the solid immersion lens can be replaced with other types of solid lenses (e.g., a gradient index lens). It should be appreciated that when a solid lens is used, the optical system includes two coupling mediums disposed between the focusing lens and the recording medium, each having a refractive index greater than one (i.e., the solid lens is a first coupling medium and the fluid bearing 25 and/or the fluid layer 21 is a second coupling medium). It should be appreciated that each of these coupling media is separable from the optical recording medium, and is not one of the layers of the recording medium that is fixed to the active layer of the recording medium. Alternatively, no additional lens need be employed at all, such that the focusing lens of the optical recording system can simply be flown close to the surface of the recording medium.

Any number of systems for flying heads above a recording medium, including those used in magnetic recording systems, can be employed that are capable of flying a head sufficiently close to the disk to achieve optical coupling of the high angle rays with the fluid bearing 25. Thus, the present invention is not limited to any particular technology for controlling the flying height of the head. An example of a system that can be employed to control the flying height of the head 29 is disclosed in U.S. Pat. No. 5,125,750, which is incorporated herein by reference. Alternatively, the system disclosed in copending U.S. patent application Ser. No. 08/804,301, filed Feb. 21, 1997, entitled FLYING HEAD WITH ADJUSTABLE LOAD ACTUATOR, which is also incorporated herein by reference, can be employed. The system disclosed in the copending application (hereafter "the illustrative system"), which is briefly discussed below, can also be used to fly the head sufficiently close to the disk to achieve optical coupling of the high angel rays to the grooves 17 when used with the fluid layer 21, even when the fluid bearing 25 is not employed.

The illustrative system maintains the flying head at a flying height substantially equal to the minimum glide height for each data track of the disk over which the head is flown, despite variation in the minimum glide height from the nominal or design minimum glide height, or variation in other parameters affecting flying height. In one embodiment of the system, this is done by measuring the minimum glide height while read/writing information. The measurement can be made by detecting whether, and with what frequency, the flying head contacts surface asperities of the disk. The flying head is lowered toward the surface of the disk to a point where a low incidence of contact with surface asperities is detected, that point being just below the minimum glide height. The flying height of the head is then controlled to maintain the head just out of range of such contacts, i.e., at the minimum glide height.

Figure 8:
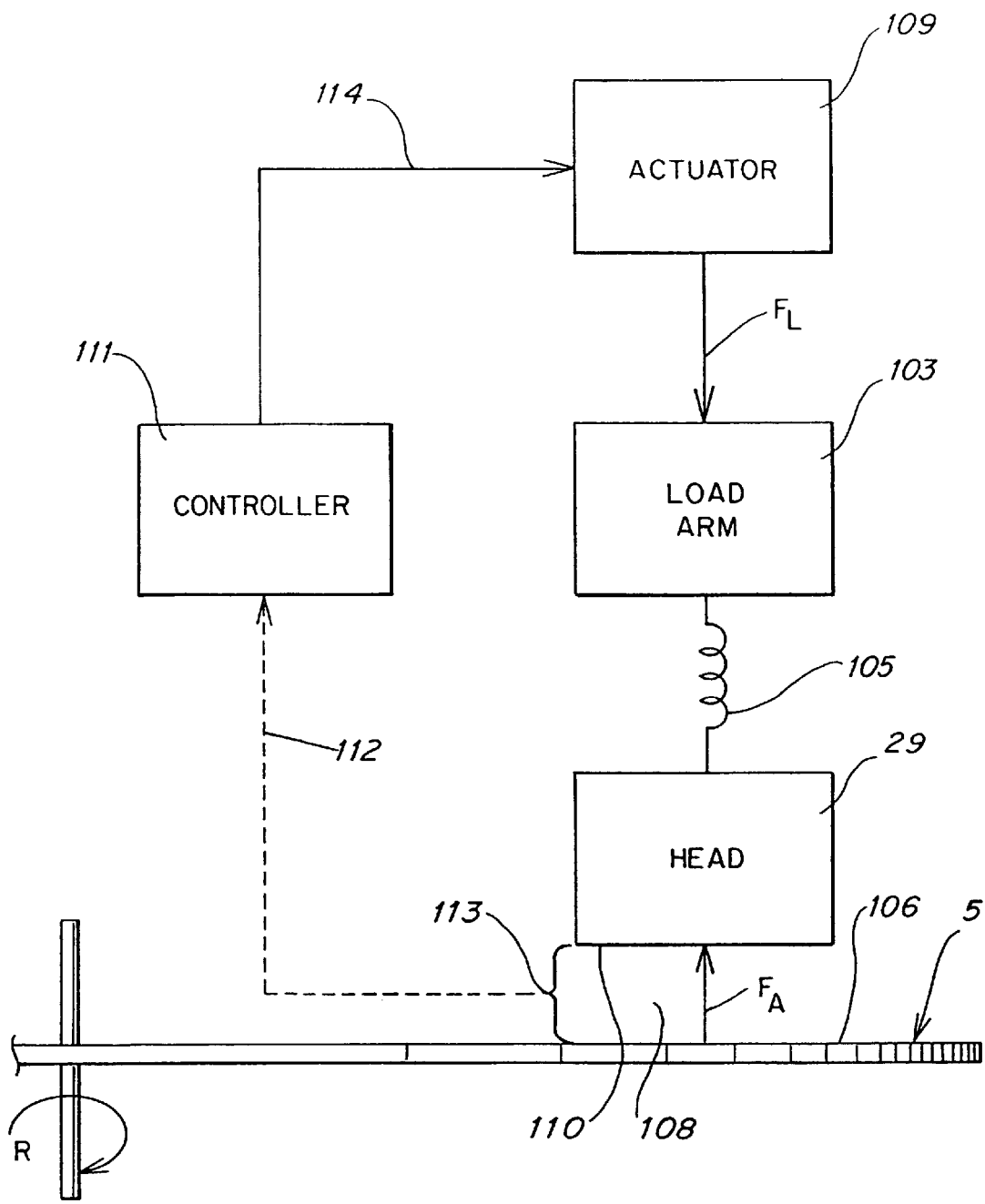
FIG. 8 is a schematic block diagram of one illustrative system for controlling the flying height of a flying head for use in a system that incorporates aspects of the present invention.

The schematic drawing of FIG. 8 is now referred to in connection with a general description of the illustrative system. As illustrated by the figure, a flying head 29 (which can be constructed in the same manner as head 29 discussed above in connection with FIGS. 5–6, or in any of a number of other ways) is resiliently mounted in a conventional manner to load arm 103 by a resilient member 105 which may be a spring, elastomer or other flexible element. Load arm 103 can be positioned by a positioner mechanism (not shown) to maintain head 29 in close proximity to disk 5. Disk 5 is rotated at high speed, generating an air bearing 108, between air bearing surface 110 of the head 29 and disk surface 106, that produces an upward force $F_A$ upon head 29. The upward force $F_A$ is balanced by a downward load force $F_L$ generated by actuator 109, and acting on the head 29 through load arm 103 and resilient member 105. The system further includes a feedback path including a controller 111 having an input that receives a signal 112 indicative of the flying height 113 of the head 29 over the disk 5, and in particular of how close the head 29 is flying relative to the minimum glide height. As will be seen below, there are many different ways in which signal 112 can be generated to indicate the flying height 113 of the head 29 over the disk 5 and whether the flying height has fallen below the minimum glide height. For example, as described below in connection with FIG. 15, piezoelectric sensors can be built into the head 29 to detect asperities or bumps on the disk 5. Detecting any asperities indicates the head 29 is too low. Alternatively, the data signal read by the head from the disk 5 can be examined for an indication, such as amplitude, high frequency resolution, or an optical signal focus, that the head 29 is too high or too low. In the embodiment of the invention wherein the piezoelectric sensors are employed, the data signal can also be examined for the indication of contact with surface asperities discussed above. The number of asperity contacts can be determined, for example, based on a ringing at a natural frequency of the head. The controller 111 produces a control signal output 114 that represents either a force or position command. The controller 111, for example, may be a general purpose processor, special purpose digital signal processing circuits and software, or analog control circuits. The control signal output 114 of controller 111 is applied to actuator 109 which adjusts the load force $F_L$ in response to the signal 114 to correspondingly adjust the flying height. The actuator 109 can, for example, be a voice coil actuator that produces a force $F_L$ proportional to the control signal.

In FIG. 8, the flying head is a damped spring-mass system. The resilient member 105 and the air bearing 108 act as springs suspending the head 29 between the surface of the disk 5 and the load arm 103. The resilient member 105 acts as a spring because of its resiliency. The air bearing 108 acts as a spring because the air itself is a compressible fluid whose pressure varies with the amount of compression.

Damping is an inherent property of both resilient member 105 and air bearing 108, neither of which are perfect springs. The damped spring-mass system enables the flying head to follow rapid (i.e., high frequency) vertical variations in the surface of the disk 107 without imparting vertical motion to load arm 103, much as an automobile suspension enables the tires to follow bumps in the road without imparting vertical motion to the passenger compartment. It should be understood that vertical variations in disk 5 cause variations in $F_A$ which result in variations in flying height. In the art of flying head technology, vertical variations in the surface 106 of the disk 5, whether rapid or not, are called vertical runout. The mass of the head 29 affects the ability of the head 29 to respond to variations in the surface 106 of the disk 5 because greater suspended mass slows the reaction time of the head 29 to variations in the surface 106 of the disk 5, a well-known property of damped spring-mass systems. Therefore, minimizing the mass of the head 29 that moves to follow disk surface variations increases the frequency response of the system (i.e., the ability of the system to follow high frequency surface variations). In addition, increasing the spring constant of the air bearing, i.e., making the air bearing less compressible, for example by changing the geometry of the air bearing surface as is known in the flying head art, also increases frequency response by increasing the mechanical coupling between the disk surface and the head through the air bearing. The resilient member 105, one of whose functions is to permit movement of the head in response to vertical runout, therefore is arranged to permit the head 29 to move vertically by a distance which should be greater than the amplitude of the high frequency component of the vertical runout of the disk. With this condition met, the head 29 responds to the high frequency variations in the surface 106 of the disk 5 and maintains a safe functional flying height.

The high frequency variations in the surface 106 of disk 5 often cause a complex combination of roll, pitch, yaw and radially directed forces on the head 29. The illustrative system address these complex forces using a gimbal arrangement, as follows. It should be understood that the disclosed gimbal arrangements are not to be considered limiting, as other conventional gimbal arrangements can also suit this purpose. The resilient member 105 can be arranged to serve as a gimbal to allow some roll and pitch motion of head 29 while preventing motion in undesirable directions. Radial motion and yaw motion is undesirable because they cause mispositioning of the head which hinders data reading and writing operations. However, vertical roll and pitch motions of the head desirably permit the head to follow variations in the surface of the disk without making contact therewith. Therefore, the effective spring constant of the resilient member 105 can be selected to be extremely high in radial and yaw directions, and lower in vertical, roll and pitch directions.

The illustrative system described generally above is now described in further detail with respect to a flying head system having a controllable load force. The system has an active suspension, in which load force may be dynamically adjusted during use, as compared to a conventional passive suspension that uses a simple damped spring-mass system in which load force is set mechanically.

Figure 9:
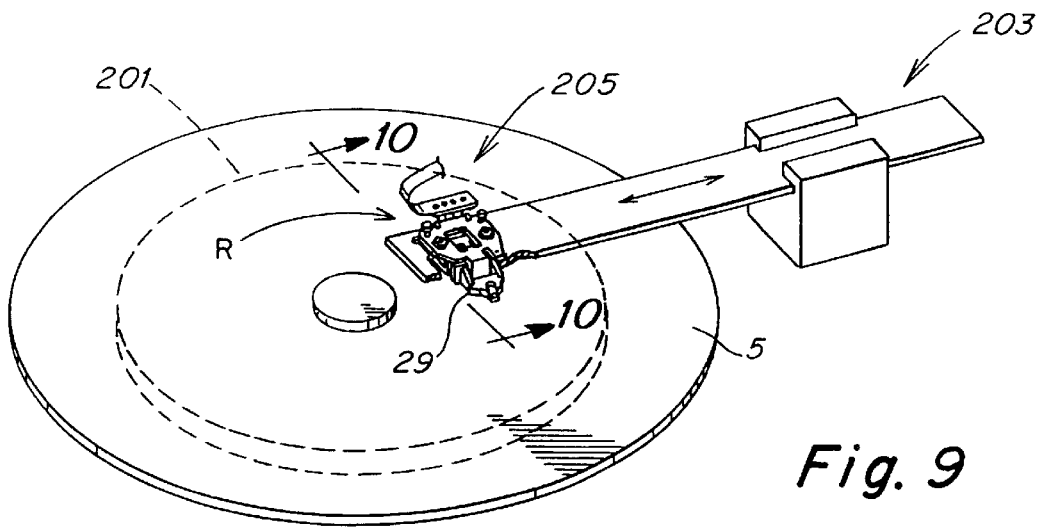
FIG. 9 is a perspective view of a disk drive incorporating an illustrative mechanism for disposing the flying head above a recording medium for use with aspects of the present invention.

A simplified perspective view of the elements of an optical disk drive system are shown in FIG. 9. In this simplified view, disk 5 is rotated in direction R by motor 201. A head positioning mechanism 203 radially positions the head 29 at a radius of the disk 5 sought to be read or written to. As discussed above, each radius of the disk 5 sought to be read or written to is referred to herein as a track. Such radial positioning is referred to as seeking or as motion in a seek direction. The head 29 is connected to the positioning system 203 through an active suspension mechanism 205 that includes load arm 103, gimbal 105 and several additional components discussed in greater detail below.

Figure 10:
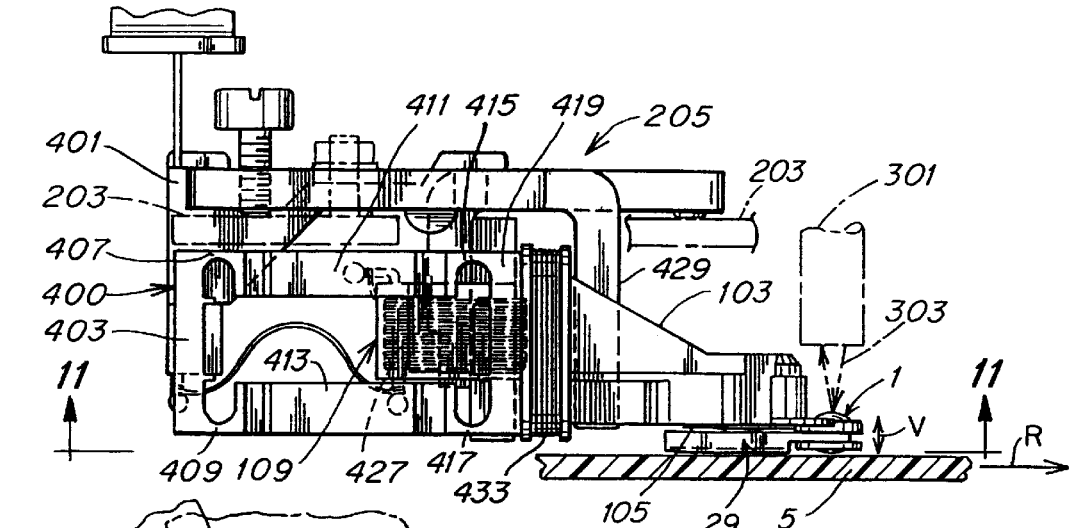
FIG. 10 is a side elevation view of a head suspension used in the disk drive of FIG. 9.
Figure 11:
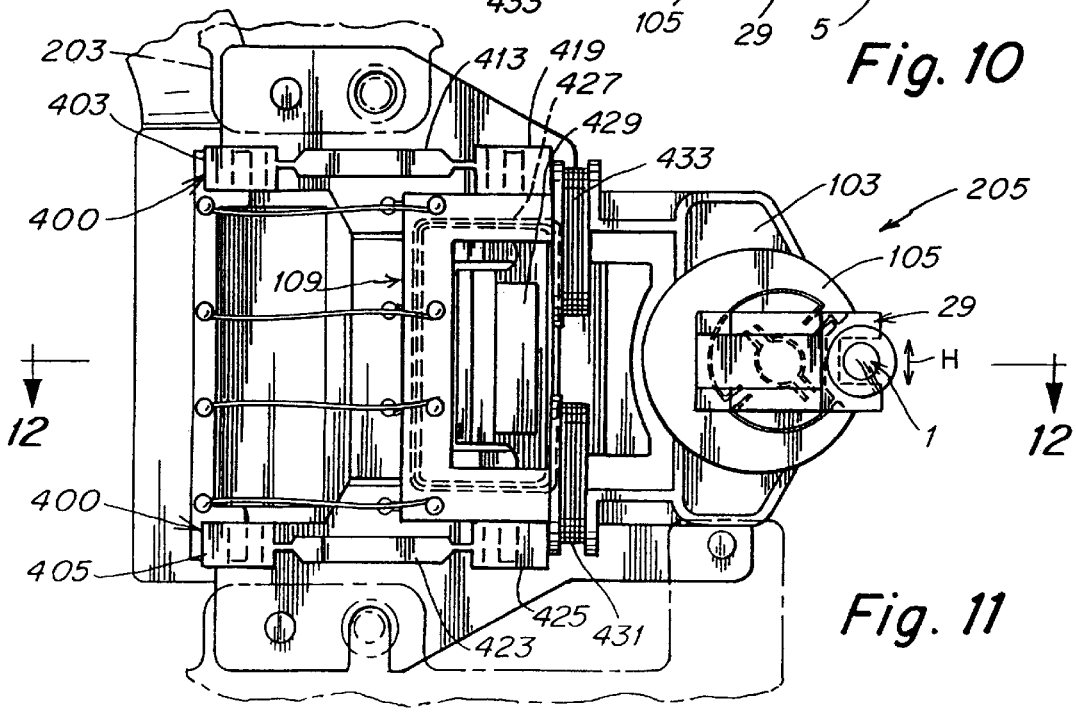
FIG. 11 is a top plain view of the head suspension of FIG. 10.

Referring to FIGS. 10 and 11, the rotary motion of disk 5 causes the disk to move past the head 29 in the direction R as shown. The head 29 is attached by a resilient member 105, such as described above, to a load arm 103. Load arm 103 is integrated with an actuator mechanism, generally indicated at 109. Finally, the combined load arm 103 and actuator 109 that carry head 29 are mounted to the positioning system 203. A laser light source 301 shines a laser beam 303 through a lens 1 which is mounted to head 29 as discussed above.

Figure 13:
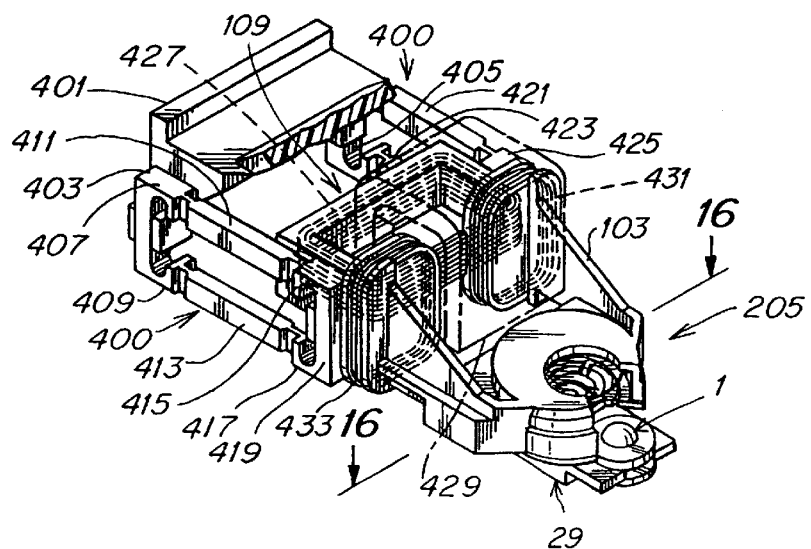
FIG. 13 is a perspective view of the head suspension of FIGS. 9–12.

The actuator mechanism 109 produces additional motion in two directions independent of the response of the head 29 to vertical runout of the disk surface 106, and independent of any movements produced by positioning mechanism 203. The actuator includes a vertically oriented voice coil 427 that produces vertical motion by acting on steel member 429. The actuator further includes transversely mounted voice coils 431 and 433 that produce an independent horizontal motion H in the seek direction, also by acting on steel member 429. In other implementations, any one or more of voice coils 427, 431 and 433 can be replaced by a different source of motive force, such as a piezoelectric element. Servo control of horizontal motion H is used to microposition head 29 over a track after seeking of positioning system 203 is complete. Movable mounts 400 connect the actuator components 109 and load arm 103 to a rigid frame 401 (FIG. 13). The rigid frame 401 is attached to the positioning mechanism 203 so that the entire suspension mechanism (FIG. 9, 205) can be quickly positioned in a desired radial location (i.e., within the micropositioning capability of the actuator mechanism 109 of a desired track) relative to the disk 5.

Figure 14:
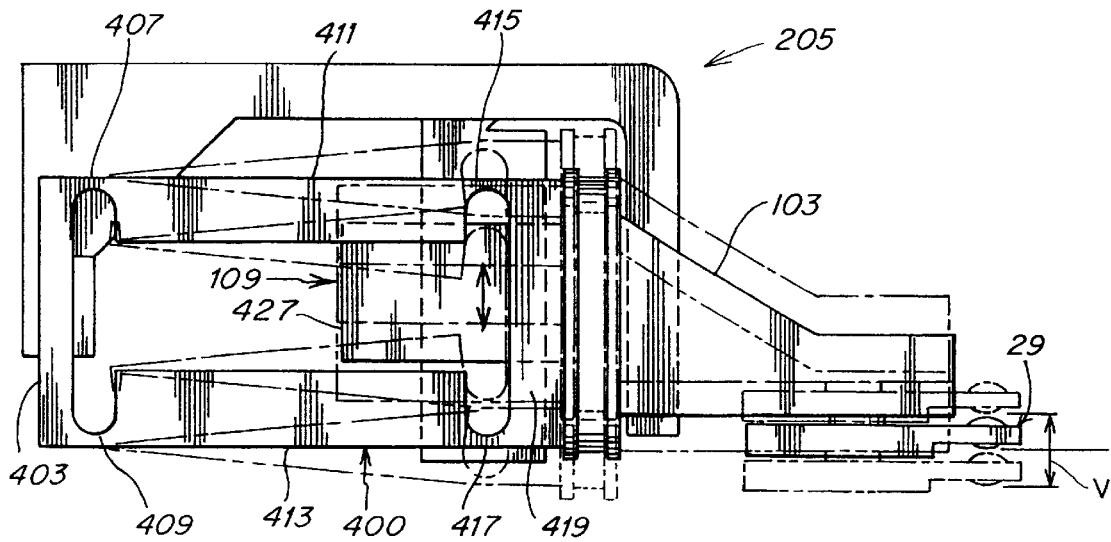
FIG. 14 is a side elevation view showing the movement of the head suspension of FIGS. 9–12.

The actuator 109 of FIGS. 10–11 and its connection to the positioning system 203 through movable mounts 400 is now described in more detail in connection with FIGS. 12–14. Suspension 205 includes a frame 401 that is rigidly connected to the positioning system 203. A pair of rigid members 403 and 405, elongated in a vertical direction, is affixed to the frame 401. At the ends of rigid member 403 are hinged supports 407 and 409, oriented for flexing in a vertical direction. Hinged supports 407 and 409 do not permit substantially any flexure in a horizontal direction. Hinged supports 407 and 409 attach swing arms 411 and 413 to rigid member 403. When at rest, swing arms 411 and 413 extend perpendicular to member 403 and substantially parallel to each other for equal distances to hinges 415 and 417, which are in turn connected to a second vertically oriented member 419. Similarly, vertical member 405 is connected through swing arms 421 and 423 to a second vertical member 425. Actuator 109 includes a voice coil 427 acting upon a steel member 429 rigidly connected to frame 401 to vertically displace vertical members 410 and 425. Load arm 103 is rigidly attached to vertical members 419 and 425.

The movable mounts 400 can be formed of a resilient plastic material or another resilient material. Thus, the flexible hinged supports act as spring elements which contribute to the ability of the head 29 to follow vertical runout of the disk surface 106.

Figure 12:
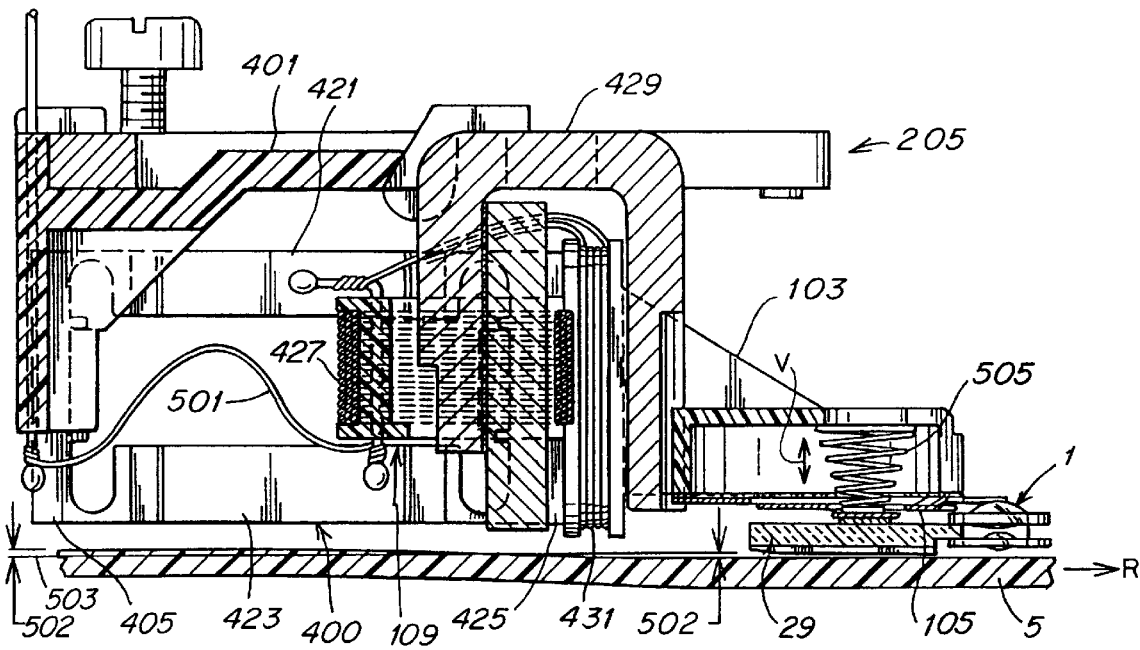
FIG. 12 is a cross-sectional view of the head suspension of FIG. 11 taken along line 12—12 of FIG. 11.

Referring specifically to FIG. 12, electrical currents applied to input wires 501 of the voice coil 427 produce up and down displacements of the voice coil 427, as indicated by double-headed arrow V, relative to frame 401. Thus, the load arm 103 and head 29 are also displaced relative to frame 401 as indicated by arrow V. As seen in FIG. 12, disk 5 may include surface perturbations 502 from a nominally flat surface 503. Perturbations 502 are slow variations, relative to the asperities discussed above. Disk motion in direction R causes head 29 to fly a small distance above disk 5. When the vertical runout of the disk 5 causes the surface 106 of the disk to move towards the head 29, the air bearing force $F_A$ increases, forcing the head upward. The head deforms the resilient member 105 as indicated by arrow V. Resilient member 105 and spring 505, when provided, are deformed by the movement of the head 29, as indicated by arrow V, until the force applied by deformable member 105 is equal to and opposite the air bearing force $F_A$. The stiffness of resilient member 105 can be set by the choice of materials and configuration of deformable member 105, and can be supplemented by providing the assistance of spring 505.

In one implementation of the illustrative system, actuator 109 is included as part of a closed loop feedback system capable of following at least low frequency vertical runout of the surface 106 of disk 5. When part of a closed loop feedback system as described above in connection with FIG.

8, actuator 109 can produce variations in load force to displace the head 29 and cause the head to follow corresponding low frequency displacements 502 in the disk surface 106 from the nominally flat condition 503, while deformation of the deformable member 105 as described above permits the head 29 to follow high frequency displacements 502 in the disk surface 106.

As previously described in connection with FIG. 8, a signal 112 representative of flying height 113 is processed by a controller 111 to produce the input signal 114 to the actuator 109. The controller 111 produces a signal 114 applied to the voice coil input through wires 501. The signal 114 applied depends upon the signal 112 representative of flying height 113. For example, the value of the signal representative of flying height may be compared to a set point value indicative of the desired flying height. The difference between the set point value and the value of the signal 112 is used to generate the signal 114. The load force applied by actuator 109 is set by the application of electrical currents, i.e., signal 114, to input wires 501 of the voice coil 427.

The signal 112 representative of flying height 113 may be derived in any of several ways. Flying height can be determined from characteristics of the laser beam 303, using a detector to detect the beam after it is directed from the source 301, through the lens 305 of the head 29, to the disk surface and then returned to a detector which can, for example, be co-located with source 301. For example, a laser beam focus signal and read signal amplitude can provide information concerning flying height. Derivation of flying height information from a laser beam focus signal is described below. It is also known that read signal amplitude varies with flying height.

A laser focus signal can be used to provide the signal 112 representative of flying height in an optical recording system. The use of the laser focus signal is advantageous because optical disk drives typically include a focus sensor that, along with its other functions, inherently generates a signal from which flying height of the optical head can be determined. Without any loss of generality, and without limiting the illustrative system to the described implementation, for the purposes of simplification, the following describes the use of focus signals with SIL heads having a lens with a fixed focal length. In such a lens, an out-of-focus condition is created by improper flying height. Examples of focus sensor systems which are common in optical disk drive applications include Foucault knife-edge sensors, half-aperture focus sensors, and astigmatic sensors employing quad detectors, all known to those skilled in this art. Astigmatic sensors are relatively immune to construction tolerance errors.

Focus sensors produce an output signal, called an s-curve, because of its general shape around the ideal focus point, whose signal value represents a distance of the lens of the head 29 from the ideal focus point. The ideal focus point is a distance above the disk surface 106. Therefore, the focus sensor output signal inherently represents the distance of the lens of the head 29 above the disk surface 106. The focus sensor output signal may be calibrated in a simple manner, for example, by measuring the focus sensor output signal value at a flying height of zero, i.e., when the disk is not spinning and the head is resting on the surface 106. The gain of the focus sensor is a substantially constant value known from the design of the sensor and relatively insensitive to construction tolerances. Therefore, the flying height can easily be computed by those skilled in the art, knowing the signal value at a flying height of zero, the signal value at the current unknown flying height and the gain of the focus sensor.

Figure 15:
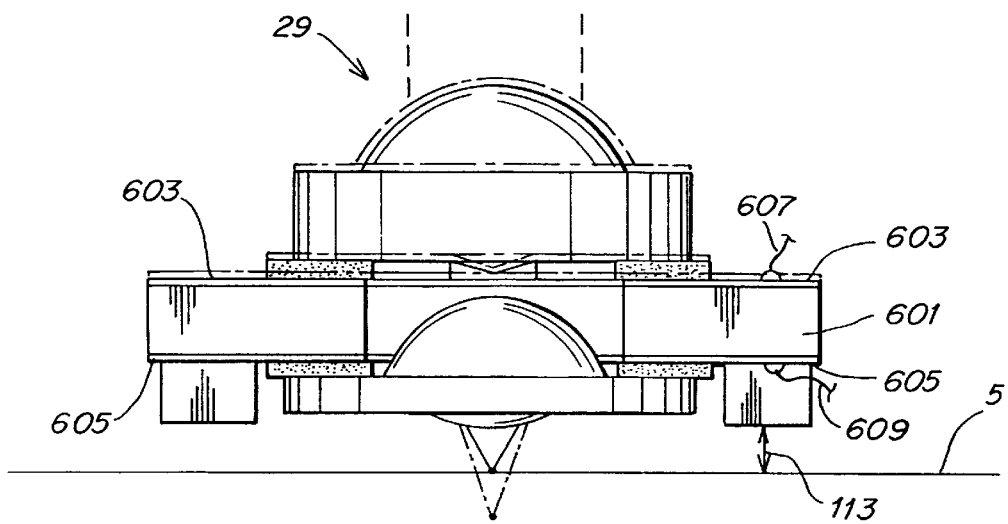
FIG. 15 is an end elevation view of a flying head including a head/disk interference sensor for use in the illustrative system of FIG. 8.

Although the use of the focus sensor is advantageous, any sensor that is capable of producing a signal representative of flying height can be used, As shown in FIG. 15, a piezoelectric transducer can alternatively be integrated into the head to provide signals 1 12 indicative of flying height 113. The body 601 of the head 29 is formed of a piezoelectric ceramic material, such as PZT, and includes electrodes 603 and 605 formed thereon. Although two are shown, more can be used. Connections 607 and 609 made to the electrodes 603 and 605 carry a signal representative of stresses under which the body of the head 29 is placed. For example, if the head 29 were to fly too close to the surface of the disk 5, at some point striking the surface of the disk 5, then the head 29 will "ring" or vibrate at some natural frequency dependent upon the mass of head 29 and the characteristics of the air bearing and suspension. A signal is generated across electrodes 603 and 605 at the natural frequency at which the head 29 rings. The amplitude of such a signal indicating contact between the head 29 and the disk 5 may be used as an indicator of head flying height 113 by the controller 111 because more frequent contact between the head 29 and the disk 5 causes the ringing to be reinforced, resulting in a larger signal amplitude. When the frequency of such contacts as indicated by the amplitude of the signal at the natural frequency is too high, then the control signal 114 to the actuator 109 is adjusted to reduce the force $F_L$, thereby increasing the flying height of the head. A flying height that is too high is indicated, for example, by observing an inadequate read signal amplitude, or using a focus error signal as described above. Alternatively, flying height may be determined solely by using other proximity sensors known in the art, such as a capacitive sensor, a magnetic sensor or an independent optical sensor.

Alternatively, a contact sensor such as the piezoelectric sensor described above can be used in connection with circuits or software which simply counts a number of contacts between the head 29 and the disk 5. A high frequency of contacts indicates too low a flying height, i.e., below the minimum glide height.

Figure 16:
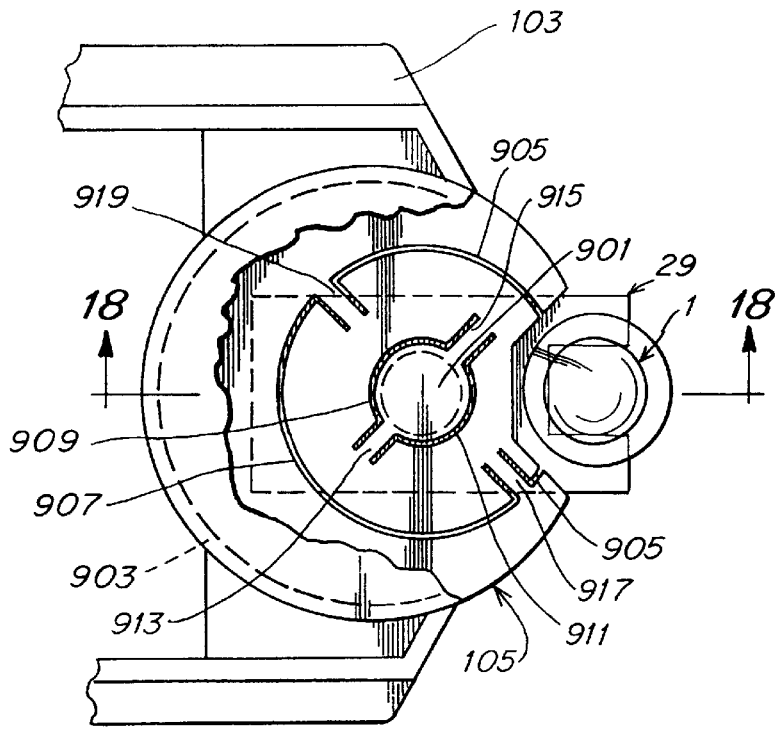
FIG. 16 is a detailed view of the head suspension of FIGS. 9–13 employing a gimbal.
Figure 17:
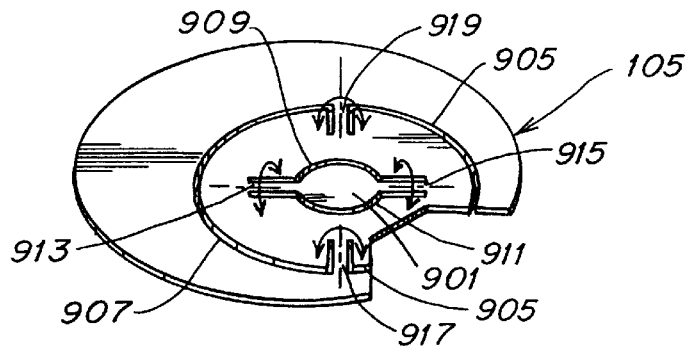
FIG. 17 is a detailed view of the gimbal of FIG. 16.
Figure 18:
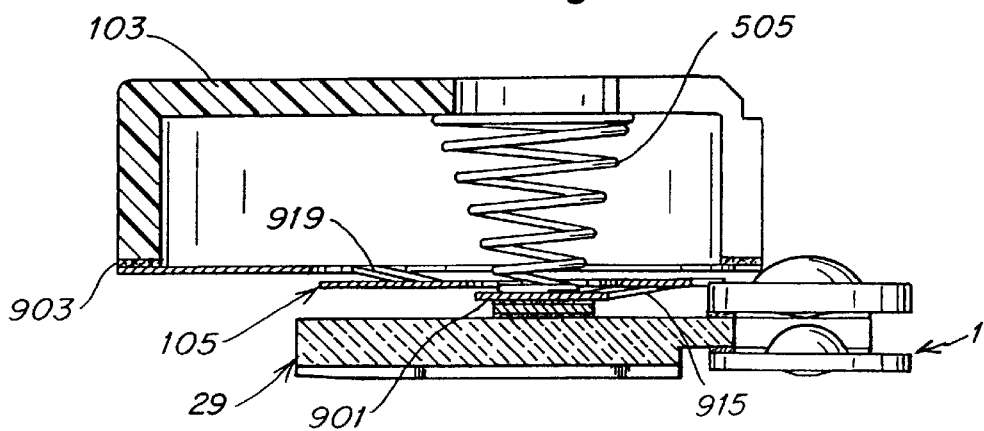
FIG. 18 is a side elevation view of the head suspension of FIG. 16 employing a coil spring.
Figure 19:
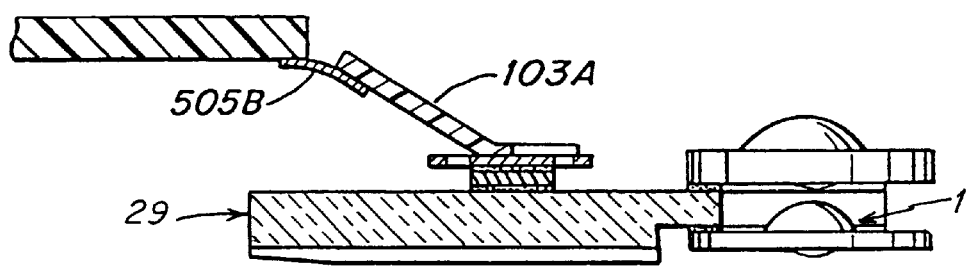
FIG. 19 is a side elevation view of the head suspension of FIG. 16 employing a leaf spring.

An example gimbal structure for implementing resilient member 105, along with related structures, is now briefly discussed in connection with FIGS. 16–19. One implementation is shown in FIGS. 16–17; and variations are shown in FIGS. 18–19. Any of these implementations of a resilient member 105 may be used in connection with the above-described illustrative system for controlling the flying height of the head.

In the implementation shown in FIGS. 16–17, the flying head 29 is connected to load arm 103 through gimbal 105. Slots 905, 907, 909 and 911 are etched into gimbal 105 to permit the gimbal to flex at a lower spring rate in some directions than in others. Yaw and radial motion is substantially inhibited by the substantial cross-sections of gimbal material through which such motion must be transmitted, while motion in the roll and pitch directions is very readily permitted by hinge regions 913, 915, 917 and 919, which act as torsion springs. The gimbal 105 can be, for example, a precision etched thin piece of stainless steel. The head 29 can be attached by applying epoxy to the gimbal 105 in region 901, which is in turn attached to load arm 103 by a quantity of epoxy in region 903. Other adhesives and attachment methods are also suitable, such as high strength glues, interference fits between parts and various clamping arrangements.

In alternate arrangements, the gimballed assembly of FIGS. 16–17 may further include a spring disposed in a position to exert additional downward force, as shown in FIGS. 18 and 19. FIG. 18 employs a coil spring to exert force at region 901 of the gimbal 105. FIG. 19 shows the use of a leaf spring that exerts force on the gimbal 105 through an auxiliary arm.

In FIG. 18, the coil spring 505 is disposed between region 901 of the gimbal 105 and the load arm 103, to increase the spring rate in the vertical direction without appreciably affecting the spring rate in the roll and pitch directions. In FIG. 19, load arm 103 is connected through a leaf spring 505B to an auxiliary arm 103A. Head 29 and auxiliary arm 103A are then connected through the gimbal 105 described in connection with FIGS. 16–17.

Having just described several illustrative embodiments of the invention, various alterations, modifications and improvements will readily occur to those skilled in the art. Such alterations, modifications and improvements are intended to be in the spirit and scope of the invention. Accordingly, the foregoing description is by way of example only and is not intended as limiting. The invention is limited only as defined in the following claims and the equivalents thereto.

What is claimed is:

1. An optical recording system for recording on an optical recording medium, which processes light from a light source, the system comprising:
    a focusing lens that focuses light generated by the light source to form a focused beam of light directed toward the recording medium;
    a first coupling medium disposed between the focusing lens and the optical recording medium, the first coupling medium having a refractive index greater than one; and a second coupling medium disposed between the first coupling medium and at least one portion of the optical recording medium, the second coupling medium being transparent and having a refractive index greater than one, the second coupling medium being separable from both the recording medium and the first coupling medium; wherein
    the first coupling medium is a solid lens, and wherein the second coupling medium includes a fluid bearing that is disposed between and in physical contact with the solid lens and the recording medium; and wherein
    the solid lens includes means for maintaining the integrity of the fluid bearing despite relative movement between the solid lens and the recording medium.

2. The optical recording system of claim 1, wherein the first coupling medium is a solid lens, wherein the focused beam of light exits the solid lens and passes through an optical path between the solid lens and the at least one portion of the recording medium, and wherein the second coupling medium is disposed between the solid lens and the at least one portion of the recording medium so that no air gap exists in the optical path.

3. The optical recording system of claim 1, wherein the second coupling medium comprises a fluid.

4. The optical recording system of claim 1, wherein the recording medium has a plurality of tracking grooves and a plurality of lands, and wherein the second coupling medium includes a fluid disposed in the plurality of grooves.

5. The optical recording system of claim 4, wherein at least one of the plurality of grooves comprises a recording area wherein information is recorded.

6. The optical recording system of claim 5, wherein the first coupling medium is a solid lens, wherein the focused beam of light exits the solid lens and passes through an optical path between the solid lens and the at least one portion of the recording medium, and wherein the second coupling medium is in direct physical contact with the solid lens and the at least one portion of the recording medium so that no air gap exists in the optical path.

7. The optical recording system of claim 4, wherein the first coupling medium is a solid lens, wherein the focused beam of light exits the solid lens and passes through an optical path between the solid lens and the at least one portion of the recording medium, and wherein the second coupling medium is in direct physical contact with the solid lens and the at least one portion of the recording medium so that no air gap exists in the optical path.

8. The optical recording system of claim 1, wherein the first coupling medium is a solid lens, wherein the recording medium and the solid lens each has a refractive index, and wherein the refractive index of the recording medium is substantially equal to the refractive index of the solid lens.

9. The optical recording system of claim 8, wherein the refractive index of the second coupling medium is substantially equal to the refractive index of the solid lens.

10. The optical recording system of claim 1, wherein the first coupling medium is a solid lens, wherein the recording medium and the solid lens each has a refractive index, and wherein the refractive index of the second coupling medium is greater than or substantially equal to the refractive index of the solid lens.

11. The optical recording system of claim 1, wherein the first coupling medium is a solid lens, wherein the recording medium and the solid lens each has a refractive index, and wherein the refractive index of the second coupling medium is greater than or substantially equal to the refractive index of the recording medium.

12. The optical recording system of claim 1, wherein the refractive index of the second coupling medium is greater than two.

13. The optical recording system of claim 1, wherein the fluid bearing comprises an optical gel.

14. The optical recording system of claim 13, wherein the recording medium has a plurality of tracking grooves and a plurality of lands, and wherein the second coupling medium includes a fluid disposed in the plurality of grooves.

15. The optical recording system of claim 1, wherein the solid lens has a contour that facilitates maintenance of the fluid bearing despite relative movement between the solid lens and the recording medium.

16. The optical recording system of claim 1, wherein the fluid bearing is formed from a fluid that is wettable to the solid lens.

17. The optical recording system of claim 1, wherein the fluid bearing is formed from a fused silica matching fluid that adheres to the solid lens.

18. The optical recording system of claim 1, wherein the fluid bearing is chemically bonded to the solid lens.

19. The optical recording system of claim 1, wherein the fluid bearing is formed from a fluid that is not wettable to the recording medium.

20. The optical recording system of claim 1, wherein the recording medium is coated with a coating fluid, and wherein the fluid bearing is formed from a fluid that is not wettable to the coating fluid.

21. The optical recording system of claim 20, wherein the coating fluid has a refractive index greater than one, so that the fluid bearing and the coating fluid together form the second coupling medium.

22. The optical recording system of claim 21, wherein the fluid bearing has a refractive index, and wherein the coating fluid has a refractive index that is approximately equal to the refractive index of the fluid bearing.

23. The optical recording system of claim 1, further including means for maintaining the integrity of the fluid bearing despite relative movement between the solid lens and the recording medium.

24. The optical recording system of claim 1, further including a first layer of a first fluid disposed atop the recording medium, and wherein the second coupling medium includes a second layer of a second fluid disposed atop the first layer, wherein the first and second fluids are different.

25. The optical recording system of claim 24, wherein the first layer is thinner than the second layer.

26. The optical recording system of claim 25, wherein each of the first and second fluids has a refractive index, and wherein the refractive index of the second fluid is greater than the refractive index of the first fluid.

27. The optical recording system of claim 24, wherein the recording medium has a plurality of tracking grooves and a plurality of lands, and wherein the second coupling medium includes a fluid disposed in the plurality of grooves.

28. The optical recording system of claim 27, wherein at least one of the plurality of grooves comprises a recording area wherein information is recorded.

29. The optical recording system of claim 1, wherein the recording medium has a plurality of tracking grooves and a plurality of lands, and wherein the coupling medium includes a fluid disposed in the plurality of grooves.

30. The optical recording system of claim 29, wherein at least one of the plurality of grooves comprises a recording area wherein information is recorded.

31. An optical recording system for recording on an optical recording medium, which manipulates a beam of light generated by a light source, the system comprising:
 a lens that is disposed between the light source and the recording medium, the lens having an exit surface from which the beam of light exits and passes through an optical path between the lens and the recording medium; and
 a coupling medium disposed between the exit surface of the lens and at least one portion of the recording medium, the coupling medium being disposed between the lens and the at least one portion of the recording medium so that no air gap exists in the optical path; wherein
  the coupling medium comprises a fluid bearing; and wherein
  the lens has a contour that facilitates maintenance of the fluid bearing despite relative movement between the lens and the recording medium.

32. The optical recording system of claim 31, wherein the coupling medium is formed from a material that is less compressible than air.

33. The optical recording system of claim 31, wherein the coupling medium comprises a fluid.

34. The optical recording system of claim 31, wherein the coupling medium has a refractive index of greater than one.

35. The optical recording system of claim 31, wherein the recording medium has a plurality of tracking grooves and a plurality of lands, and wherein the coupling medium includes a fluid disposed in the plurality of grooves.

36. The optical recording system of claim 35, wherein at least one of the plurality of grooves comprises a recording area wherein information is recorded.

37. The optical recording system of claim 31, wherein the recording medium and the lens each has a refractive index, and wherein the refractive index of the recording medium is substantially equal to the refractive index of the lens.

38. The optical recording system of claim 31, wherein the recording medium and the lens each has a refractive index, and wherein the refractive index of the coupling medium is greater than or substantially equal to the refractive index of the lens.

39. The optical recording system of claim 31, wherein the recording medium and the lens each has a refractive index, and wherein the refractive index of the coupling medium is greater than or substantially equal to the refractive index of the recording medium.

40. The optical recording system of claim 31, wherein the refractive index of the coupling medium is greater than two.

41. The optical recording system of claim 31, wherein the fluid bearing comprises an optical gel.

42. The optical recording system of claim 31, wherein the lens includes means for maintaining integrity of the fluid bearing despite relative movement between the lens and the recording medium.

43. The optical recording system of claim 31, wherein the fluid bearing is formed from a fluid that is wettable to the lens.

44. The optical recording system of claim 31, wherein the fluid bearing is chemically bonded to the lens.

45. The optical recording system of claim 31, wherein the fluid bearing is formed from a fluid that is not wettable to the recording medium.

46. The optical recording system of claim 31, wherein the recording medium is coated with a coating fluid, and wherein the fluid bearing is formed from a fluid that is not wettable to the coating fluid.

47. The optical recording system of claim 46, wherein the coating fluid and the fluid bearing each forms a portion of the coupling medium.

48. The optical recording system of claim 31, further including means for maintaining integrity of the fluid bearing despite relative movement between the lens and the recording medium.

49. The optical recording system of claim 31, wherein the coupling medium includes a first layer of a first fluid disposed atop the recording medium, and a second layer of a second fluid disposed atop the first layer, wherein the first and second fluids are different.

50. The optical recording system of claim 49, wherein the first layer is thinner than the second layer.

51. The optical recording system of claim 50, wherein each of the first and second fluids has a refractive index, and wherein the refractive index of the second fluid is greater than the refractive index of the first fluid.

52. The optical recording system of claim 31, wherein the recording medium has a plurality of tracking grooves and a plurality of lands, and wherein the coupling medium includes a fluid disposed in the plurality of grooves.

53. The optical recording system of claim 31, wherein the lens is a focusing lens.

54. The optical recording system of claim 53, further including means for maintaining integrity of the fluid bearing despite relative movement between the lens and the recording medium.

55. An apparatus, comprising:
 an optical recording medium; and
 at least one layer of fluid disposed atop the optical recording medium, the layer of fluid being transparent and having a refractive index greater than one, wherein the at least one layer of fluid includes a first layer formed of a first fluid and a second formed of a second fluid, wherein the first and second fluids are different.

56. The optical recording medium of claim 55, wherein the optical recording medium has a refractive index, and wherein one of the first fluid and the second fluid has a refractive index that is substantially equal to the refractive index of the optical recording medium.

57. The optical recording medium of claim 55, wherein the optical recording medium has a plurality of tracking grooves and a plurality of lands, and wherein the at least one layer of fluid substantially fills the plurality of grooves.

58. The optical recording medium of claim 57, wherein the optical recording medium has a refractive index, and wherein one of the first fluid and the second fluid has a refractive index that is substantially equal to the refractive index of the optical recording medium.

59. The optical recording medium of claim 55, wherein the first layer is thinner than the second layer.

60. The optical recording medium of claim 59, wherein each of the first and second fluids has a refractive index, and wherein the refractive index of the second layer is greater than the refractive index of the first fluid.

* * * * *